Oct. 13, 1925.  
W. C. KEISH ET AL  
CANDY MAKING MACHINE  
Filed Sept. 21, 1922  
1,556,610  
6 Sheets-Sheet 2
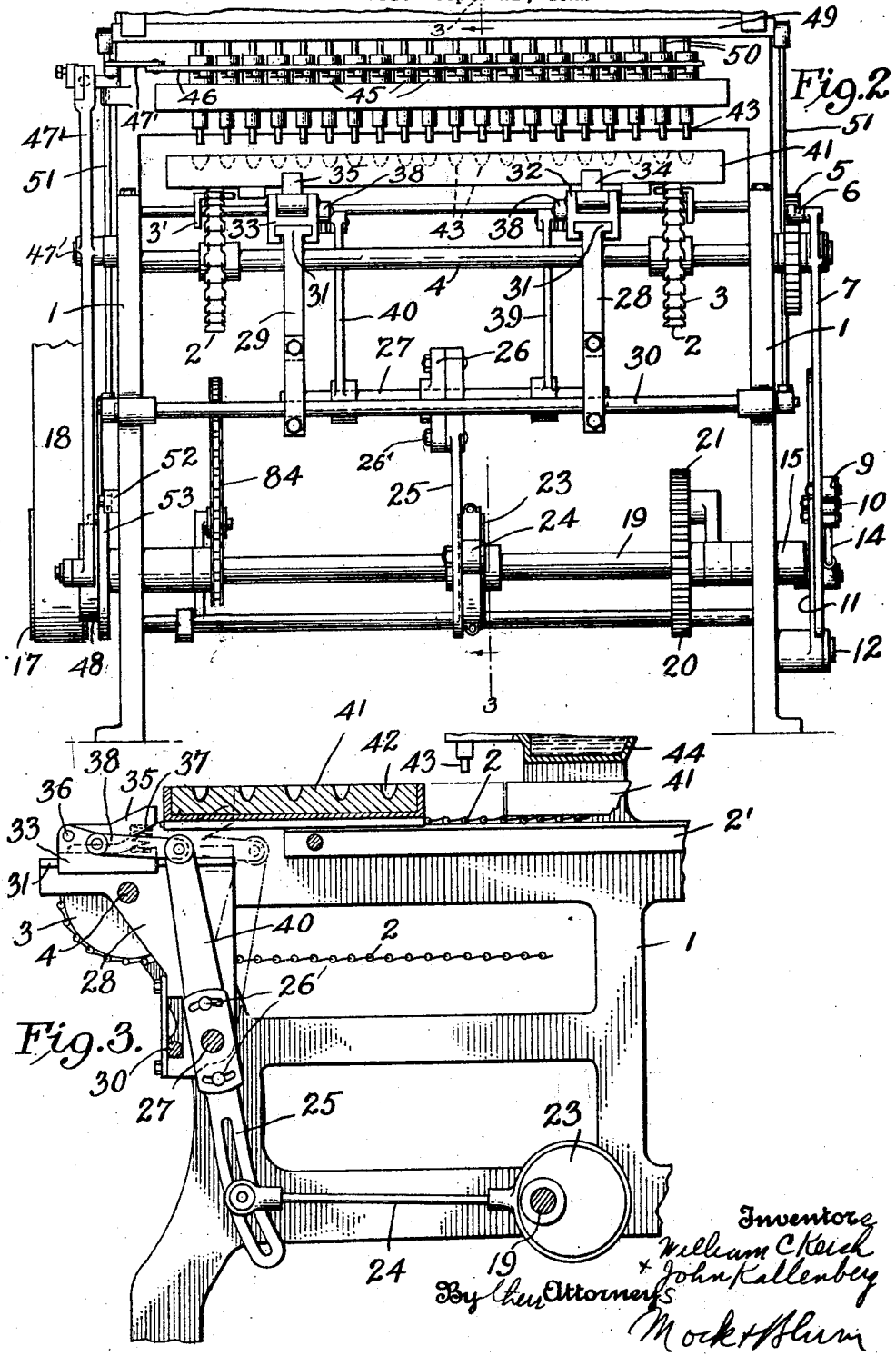

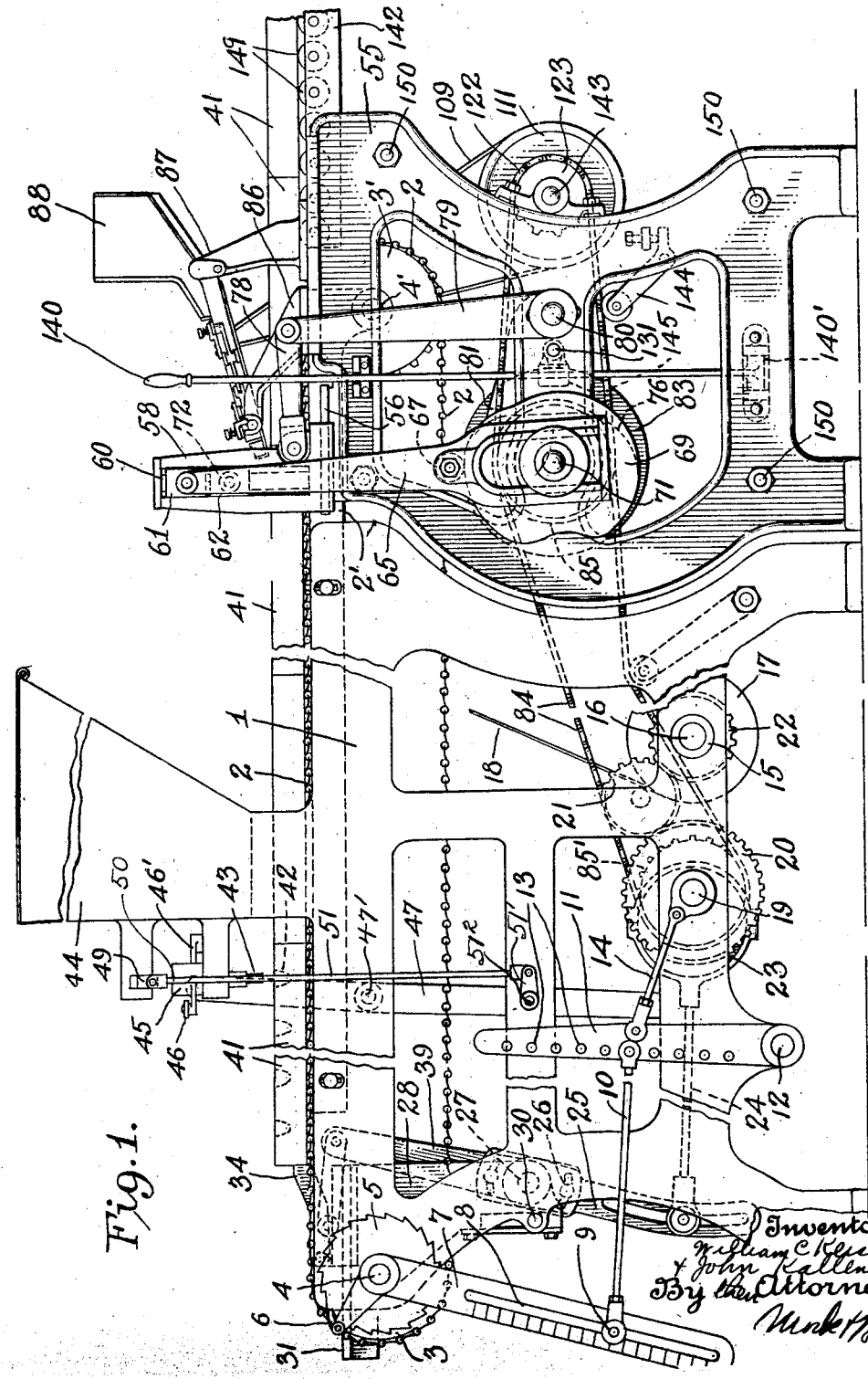

Oct. 13, 1925.
W. C. KEISH ET AL
1,556,610
CANDY MAKING MACHINE
Filed Sept. 21, 1922     6 Sheets-Sheet 3
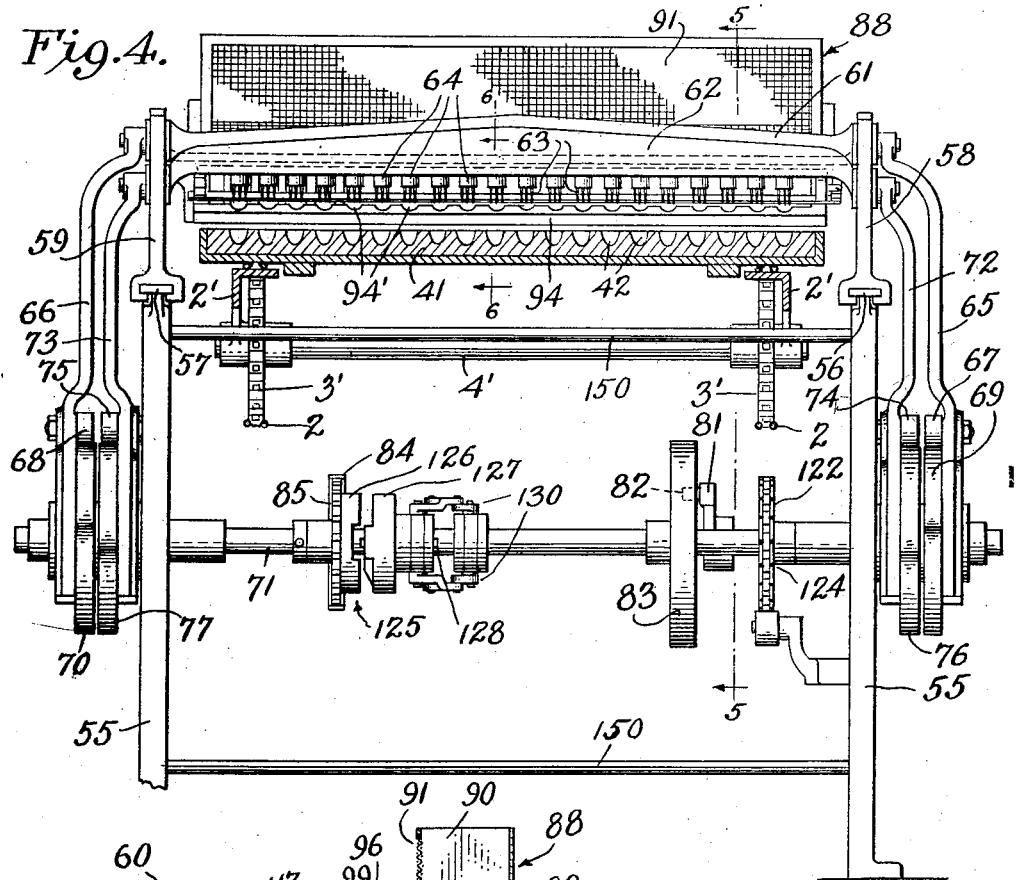
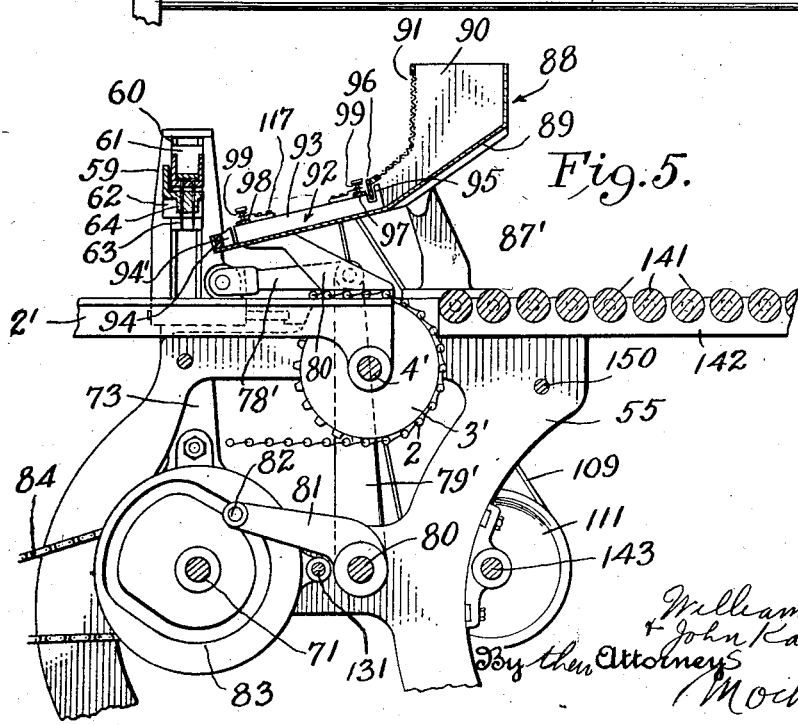

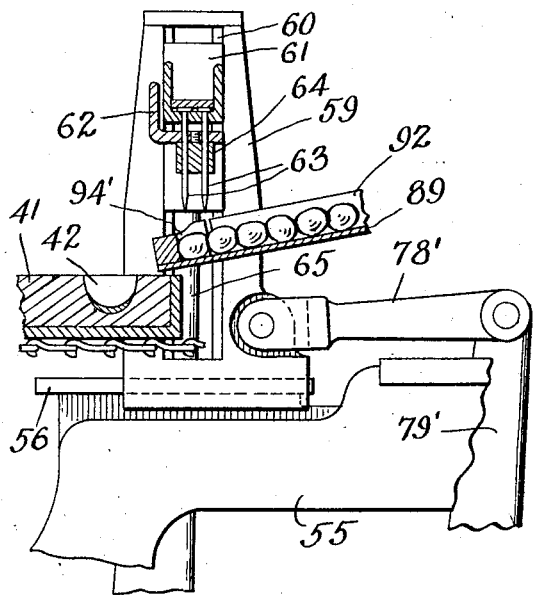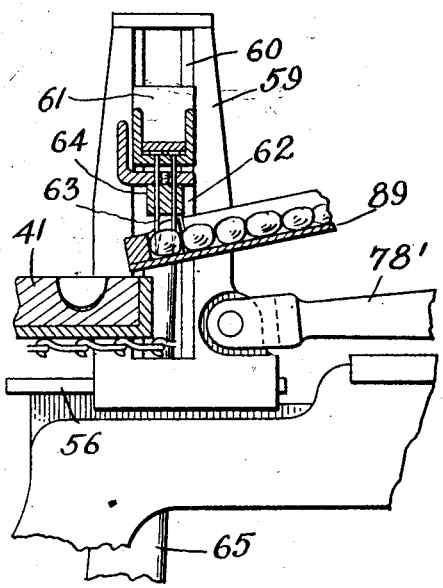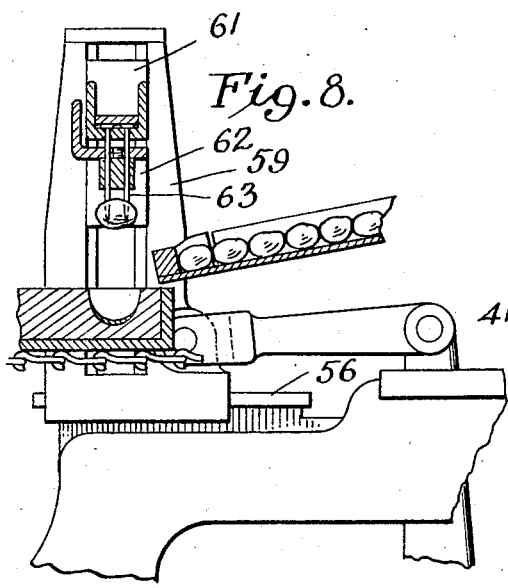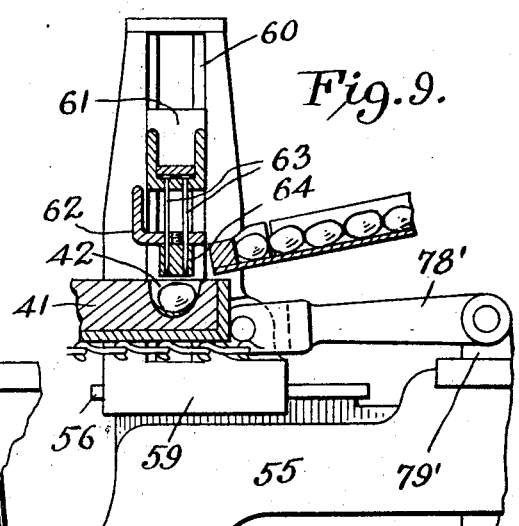

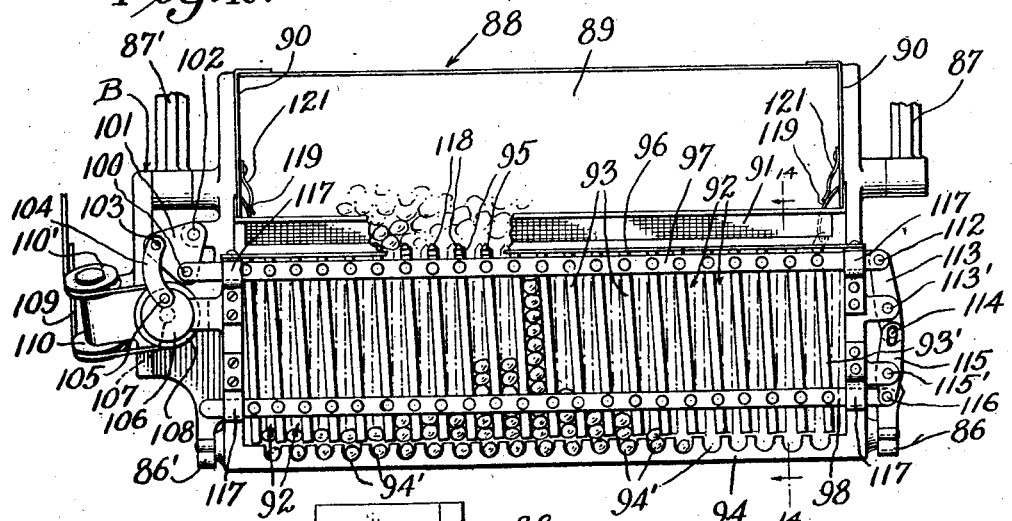

Oct. 13, 1925.

W. C. KEISH ET AL

CANDY MAKING MACHINE

Filed Sept. 21, 1922  6 Sheets-Sheet 6

1,556,610

Patented Oct. 13, 1925.

1,556,610

UNITED STATES PATENT OFFICE.

WILLIAM C. KEISH AND JOHN KALLENBERG, OF BROOKLYN, NEW YORK, ASSIGNORS TO E. GREENFIELD'S SONS, A CORPORATION OF NEW YORK.

CANDY-MAKING MACHINE.

Application filed September 21, 1922. Serial No. 589,528.

*To all whom it may concern:*

Be it known that we, WILLIAM C. KEISH and JOHN KALLENBERG, citizens of the United States, residing, respectively, at 2025 Regent Place and 535 Bainbridge Street, Brooklyn, in the county of Kings and State of New York, have invented certain new and useful Improvements in Candy-Making Machines, of which the following is a specification.

Our invention relates to a new and improved machine for making candy.

One of the objects of our invention is to provide a machine for making candies having coated centers, and fruit centers in particular, such as coated cherries.

Another object of our invention is to provide a machine in which the coatings in the liquid conditions are automatically poured into suitable recesses and the centers are automatically immersed in the said liquid centers.

Another object of our invention is to provide new and improved mechanism for handling the centers so as to feed them to the coating mechanism.

Another object of our invention is to provide mechanism for automatically handling the starch trays which are used in making various kinds of coated candies.

Another object of our invention is to provide a machine in which the starch trays or the like are automatically forced into the proper relative position on the means for feeding them forward.

Another object of our invention is to provide clutch mechanism whereby the machine can be started or stopped only at a period of its operation where the parts are in proper position.

Other objects of our invention will be set forth in the description and drawings which illustrate a preferred embodiment thereof.

In making chocolate covered cherries by hand, a tray is first filled with a layer of starch. A series of depressions are then formed in the starch and these depressions are then filled with a so-called cream in the liquid condition. The starch prevents the cream from running out of these depressions. Cherries are then immersed in the little pools of cream found in the various depressions, and the cream is then allowed to harden by exposure to the air. The combined cherry and cream centers thus formed are removed from the starch tray, the adhering starch may then be removed and the centers may then be coated with chocolate by dipping them.

It is a special object of our invention to make the said fruit centers by machine although our invention is not restricted to this, and a preferred embodiment of such a machine is illustrated herein.

Fig. 1 is a side elevation.

Fig. 2 is a front elevation.

Fig. 3 is a section on the line 3—3 of Fig. 2.

Fig. 4 is a front elevation of the mechanism for handling the cherries and found at the right hand side of Fig. 1.

Fig. 5 is a section on the line 5—5 of Fig. 4.

Fig. 6 is a section on the line 6—6 of Fig. 4.

Fig. 7 is a view similar to Fig. 6 showing the parts in a different position.

Figs. 8 and 9 are similar to Figs. 6 and 7 showing the parts in different positions.

Fig. 10 is a plan view of the cherry hopper.

Fig. 11 is a partial side elevation of the cherry hopper.

Fig. 12 is a view of one of the two end cherry feeding bars shown in Fig. 10.

Fig. 13 is a view of an intermediate cherry feeding bar.

Fig. 14 is a sectional view on the line 14—14 of Fig. 10.

Figure 15:
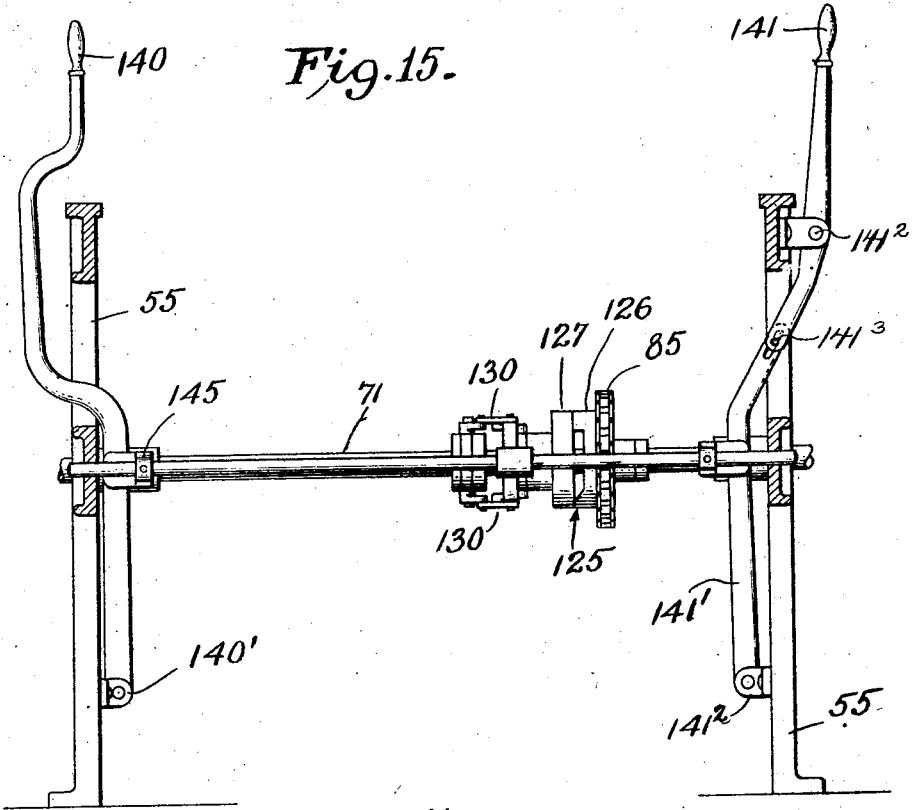
Fig. 15 is a view of the clutch mechanism.

As shown in Fig. 1, the main drive shaft 16 has a drive pulley 17 driven by a belt 18 connected to any suitable source of power. The shaft 16 has the gear 22 connected to the intermediate gear 21 which meshes with the gear 20 mounted upon the intermediate shaft 19. The intermediate shaft 19 has an eccentric 23 connected to the eccentric rod 24. Shaft 16 has crank 15, having rod 14 adjustably secured to lever 11 pivoted at 12. The rod 24 is adjustably connected to the lever 25. The lever 25 is adjustably connected by means of bolts 26' to the block 26 pivotally mounted on the shaft 27. The lever 11 has a series of holes 13 to any one of which the link 10 can be pivotally connected. The link 10 is adjustably secured by means of the set screw 9 to the slot 8 of the bell crank lever 7 which is mounted on shaft 4.

The bell crank lever 7 has the pawl 6 whereby it intermittently revolves the ratchet wheel 5, mounted on the shaft 4. The sprockets 3 and 3' are mounted upon the shafts 4 and 4' so that when the shaft 4 is intermittently revolved by the movement of ratchet wheel 5 this causes the intermittent forward movement of the top of chain 2. The starch trays 41 are placed upon the chains 2.

The pawls 34 and 35 are pivoted at 32 and 36 to the slides 33 and these slides can slide to and fro upon the guides 31 connected to the frame members 28 and 29 of the machine. The slides 33 are connected by means of the links 38 to the levers 39 and 40. The levers 39 and 40 are mounted upon the shaft 27 which is supported by the frame members 28 and 29. The first oscillation of the levers 39 and 40 causes each tray 41 to be put in the proper position on the top of conveyer chain 2, so that it is properly carried along by the succeeding intermittent movements of the chain 2. The pawls 34 and 35 have springs 37 connected to their slides whereby they are held as shown in Fig. 3.

The tray 41 is filled with starch and depressions 42 are formed therein by a series of mold members. The rows of depressions 42 pass under the nozzles 43 of the tank 44 which is filled with liquid cream as the tray 41 is advanced. The cream tank 44 has a series of valves 45 of any known construction which control the nozzles 43. These valves 45 are all connected to and are rocked horizontally by the valve rod 46 so as to open and close them. The valve rod 46 is connected to the link 46' and this is operated by the vertical lever 47 pivoted at 47' and this lever 47 is operated by the cam 48 mounted on the shaft 19. The cream plungers 50 located in nozzles 43 are connected to the rod 49. The rod 49 is connected to the two vertically movable links 51 pivoted at 51². One of said links 51 is moved up and down by cam 53 operating against roller 52 connected to one of said links, by an intermediate member as shown in Fig. 2.

The cherries are thrown into the hopper 88. The hopper 88 has the inclined bottom 89, side walls 90 and a front wall 91 formed like a screen. The cherries fall to the bottom of the hopper and pass down to the channels 92. A bar 96 is provided so that only one layer of cherries can pass through the channels 92. The channels 92 are the spaces between the intermediate bars 93, and the spaces between said bars 93 and end bars 93'. As shown in Fig. 13, the bars 93 are provided with vertical notches 95 into which the bar 96 projects. The bars 93 are pivoted to the bars 97 and 98 by studs 99 and they have bevelled fronts 118 so that the cherries can roll between them. The bars 97 and 98 are oscillated to and fro between guide brackets 117 in the frame 94 which is mounted at the bottom of the trough. At one side the bars 97 and 98 are connected by the links 113 and 115. The link 113 is connected to bar 97 by the pivot 112 and the link 115 is connected to bar 98 by the pivot 116. The levers 113 and 115 are pivoted to the frame at 113' and 115' and they have a pin and slot connection 114 so that they move in unison.

The bar 97 is pivotally connected at 100 to the lever 101 pivoted at 102. The lever 101 is oscillated by means of the link 104 pivoted thereto at 103 and pivotally connected at 105 to the wheel 106 secured to the vertical shaft 107. The vertical shaft 107 has the pulley 108 secured thereto. The belt 109 passes around the pulley 108 and the pulleys 110 and 110' and around the pulley 111 mounted upon the shaft 143.

The shaft 143 is driven by the chain 122 which passes around sprocket 123 and also around the sprocket 124 mounted upon the shaft 71. The shaft 71 is revolved by the chain 84 which passes around its sprocket 85 and is driven by the sprocket 85' mounted upon the shaft 19.

The cherries are shaken down by the oscillation of bars 93 and 93' until they come to a rest in the recesses 94' of bar 94. The end bars 93' have leaf springs 119 pivotally connected thereto at 120 and cooperating with springs 121 to compel the cherries to pass into channels 92.

In order to pick the cherries from the recesses 94' the following mechanism is used:

Slides 58 and 59 are slid to and fro on the guides 56 and 57 by means of the links 78 and 78' which are connected to the levers 79 and 79' mounted on the shaft 80. The guides 56 and 57 are located on frame members 55. The shaft 80 is oscillated by means of the arm 81 having the roller 82 and cooperating with the cam slot in the cam 83 mounted on the shaft 71.

The slide 59 has an upper sliding bar 61 and a lower sliding bar 62 mounted therein. The upper slide bar 61 has the pins or needles 63 connected thereto and these pins slide through heads 64 in the lower slide bar 62. Each head 64 has three needles 63 projecting through it. The bars 61 and 62 slide in guide 60 located in slide 59.

The upper bar 61 is moved up and down by the outer links 65 and 66 and the lower bar 62 is vertically oscillated by the inner links 72 and 73. These links 65, 72, 73 and 66 are respectively provided with the rollers 67, 74, 75 and 68 which are respectively operated by the cams 69, 76, 77, and 70, mounted upon the shaft 71.

Figure 16:
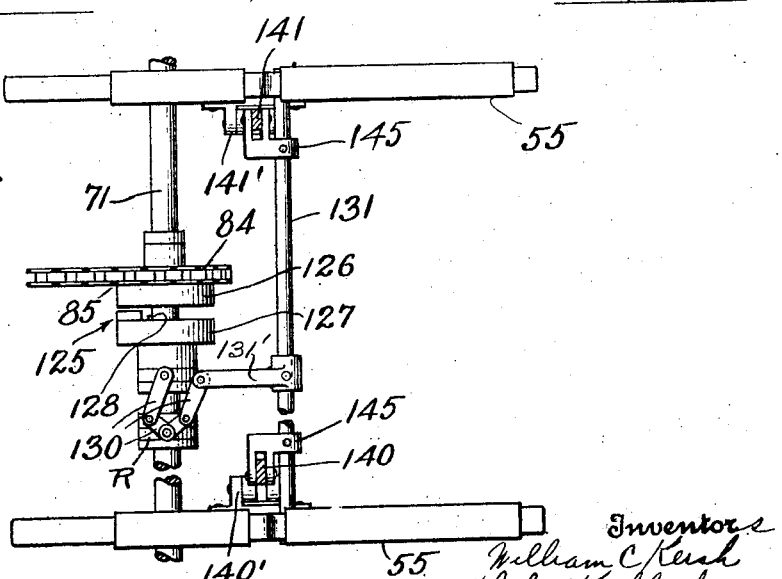
Fig. 16 is a top view of the clutch mechanism.

The sprocket wheel 85 is mounted loosely upon the shaft 71. The sprocket 85 is provided with the clutch member 126. The clutch members 126 and 127 have interfitting parts forming a clutch 125. The member 127 is part of a sleeve which can be slid to and fro by means of the three links 130 shown in Fig. 16. The ring R is mounted upon the shaft 71 so that the shaft 71 can revolve freely with respect thereto, but the ring R cannot be shifted longitudinally upon the shaft 71 and one of the links 130 is pivoted thereto.

The bar 131 is slidably mounted in the frame bracket 145. The bar 131 is connected to one of the links 130 by the member 131' and it is also connected to the levers 140 and 141'. The lever 140 is pivoted at 140' and when it is thrown to the right of the position shown in Figure 15, it unlocks the clutch. The lever 141' is pivotally mounted at 141² and it is connected to lever 141 by the slot and pin connection 141³. 2' is a frame that supports the chain 2 and the shaft 4'. The clutch part 126 has an inclined bevel as shown in Figure 15 so as to permit the clutch 125 to engage only when the starch tray is in proper position with respect to nozzles 43. The member 127 is keyed to shaft 71 by pin 128.

The frame members are connected by bolts 30 and 150. The chain 84 is supported by rollers mounted on levers 144.

The operation of our machine is as follows:—

The operator fills a starch tray with starch and forms the depressions 42 therein. He then fills the cream tank 44 and the cherry hopper 88. The machine is then started by connecting the shaft 16 to some moving shaft, while the clutch 125 is disconnected. The tray 41 is then placed upon the upper half of the chain 2. The pawls 34 and 35 contact with the tray 41 and push it forwardly upon the said chain 2 which has a relatively slow intermittent movement. This places the tray in the correct relative position on the chain so that the lateral rows of depressions 42 are successively moved under the nozzles 43. During the period of rest of the chain 2, the valves 45 are opened and the plungers 50 are operated to force a suitable amount of cream into each depression 42.

The operator then throws in or connects the clutch 125 by moving lever 140 or lever 141. The clutch members will not connect to cause the revolution of the shaft 71 save when the parts are in such position that the intermittent movement of the chain 2 will successively present the rows of depressions 42 to the nozzles 43. Since the shaft 71 and the member 127 secured thereto are revolved together with the shafts 4 and 4', the pawls 34 and 35 operate to properly position the trays 41 with respect to the mechanism for placing the cherries into the depressions 42.

After the cherries have been properly put into the little pools of cream in the depressions 42, the trays are automatically moved out of the machine on the rollers 149.

More cream can now be poured over the cherries, and the centers thus formed can be further treated, dipped to coat them with chocolate, etc.

We have shown a preferred embodiment of our invention, but numerous changes and omissions can be made without departing from its spirit, and where we refer to the parts by means of reference numerals, either in the description or claims, we do not wish to be limited to the details therein disclosed.

It is obvious that the movements of the members 61 and 62 are so regulated that they descend in unison to cause each set of needles to pick up a cherry. They then ascend in unison and move over the tray and the member 62 is then caused to descend with respect to 61 so that the cherries are stripped from the needles 63, and are deposited into the depressions, as shown in Fig. 9.

In Fig. 9, the head 64 is shown as spaced from depressions 42, but when the cherries are stripped, said head projects into said recesses so that the cherries are positively moved into the recesses.

Wherever cherries are mentioned in the description or claims, this includes all other articles which may be used in making candy.

We claim:—

1. In a candy making machine, a conveyor adapted to transport a tray having a series of depressions therein, means adapted to operate said conveyor, means adapted to feed a liquid coating into said depressions at a given point in the movement of said conveyor, and second means adapted to feed cherries or the like to be coated into said depressions at a subsequent point in the movement of said conveyor, said second means having a plurality of parts, one of said parts being adapted to move in a direction substantially parallel to the direction of movement of said conveyor, and another part being adapted to independently move in a direction substantially perpendicular to said conveyor.

2. In a candy making machine the combination with means adapted to support a tray or the like, of a hopper adapted to have articles fed therein, a series of inclined movable bars located above an inclined bottom member and having spaces between them, said spaces being in communication with said hopper, means adapted to oscillate said movable bars in order to cause said articles to enter into said spaces and move in the direction of the lengths of said bars, and means adapted to seize said articles from said spaces and transport them away from said spaces.

3. In a candy making machine, the combination with means adapted to support a tray or the like of the hopper 88 having the inclined bottom 89, the inclined bars 93, the bar 96, and means adapted to move said bars 93 to and fro.

4. In a candy making machine the combination with means adapted to support a tray or the like of the hopper 88 having the inclined bottom 89, the bars 93 pivoted to the bars 97 and 98, connecting means between said bars 97 and 98 and adapted to cause them to reciprocate in unison, and means adapted to move one of said reciprocating bars.

5. A device according to claim 4, in combination with the springs 121, and the end bars 93' having the springs 119 connected thereto and contacting with the springs 121.

6. In a candy making machine the combination with means adapted to support a tray or the like of the hopper 88 having the inclined bottom 89, the bars 93 and 93' having the notches 95, the bar 96 projecting into said notches, and means for moving said bars, 93 and 93'.

7. In a candy making machine the combination with means adapted to support a tray or the like of the hopper 88 having the inclined bottom 89, the bar 94 having the recesses 94', said recesses being in free communication with said hopper 88, means adapted to agitate articles placed within said hopper and adapted to cause said articles to enter recesses 94', and means for carrying articles out of and away from said recesses 94'.

8. In a candy making machine, the combination with means adapted to support and intermittently move a tray or the like, of holding means adapted to hold cherries or the like, means adapted to impart reciprocating movements to said holding means in a direction parallel to and in a direction perpendicular to said tray, and means for causing the removal of said cherries from said holding means.

9. In a candy making machine, the combination with means adapted to support and intermittently move a tray or the like, of carrying mechanism having movable holding means adapted to hold cherries or the like and secured thereto, means for moving said carrying mechanism and means for moving said holding means, perpendicular to said tray and means connected to said carrying mechanism and adapted to cause the removal of the said articles from said holding means.

10. In a candy making machine, the combination with means adapted to support a tray or the like of laterally slidable means having the bars 61 and 62 slidably secured thereto, the slide bar 61 having the needles 63 projecting through heads 64 connected to bar 62, means for actuating said slidable means, and means for actuating the bars 61 and 62 independently.

In testimony whereof we hereunto affix our signatures.

WILLIAM C. KEISH.
JOHN KALLENBERG.